: Patent Number: 5,445,779
: Date of Patent: Aug. 29, 1995

United States Patent [19]
Pierini et al.

[54] PROCESS FOR THE DRYING AND HEAT-TREATMENT OF POLYBENZAZOLE FILMS

[75] Inventors: Peter E. Pierini, Midland, Mich.; Myung H. Cho, Daejeon, Rep. of Korea

[73] Assignee: The Dow Chemical Company, Midland, Mich.

[21] Appl. No.: 182,818

[22] Filed: Jan. 14, 1994

[51] Int. Cl.⁶ .................. B29C 47/00; B29C 55/08; B29C 71/02
[52] U.S. Cl. .................. 264/210.5; 264/211.2; 264/235.6; 264/288.4; 264/346
[58] Field of Search ............... 264/210.5, 210.7, 211.2, 264/235.6, 235.8, 288.4, 290.2, 345, 346

[56] References Cited

U.S. PATENT DOCUMENTS

| | | |
|---|---|---|
| 3,223,764 | 12/1965 | Kahn et al. |
| 3,502,766 | 3/1970 | Tsuruta et al. |
| 3,663,683 | 5/1972 | Czerkas et al. |
| 4,457,254 | 7/1984 | Hungerford |
| 4,487,735 | 12/1984 | Chenevey et al. |
| 4,512,894 | 4/1985 | Wang |
| 4,554,119 | 11/1985 | Chenevey |
| 4,610,833 | 9/1986 | Kanesaki et al. |
| 4,690,792 | 9/1987 | Matsuda et al. |
| 4,871,595 | 10/1989 | Lusignea et al. |
| 4,898,924 | 2/1990 | Chenevey et al. |
| 4,939,235 | 7/1990 | Harvey et al. |
| 4,963,428 | 10/1990 | Harvey et al. |
| 4,966,806 | 10/1990 | Lusignea et al. |
| 4,973,442 | 11/1990 | Harvey et al. |
| 5,034,078 | 7/1991 | Hodgson, Jr. et al. |
| 5,053,180 | 10/1991 | Wang et al. |
| 5,302,334 | 4/1994 | Pierini et al. ............... 264/290.2 X |

OTHER PUBLICATIONS

Lusignea, "Film Processing and Applications for Rigid-Rod Polymers," *Mat. Res. Soc. Symp. Proc.*, vol. 134 (1989) pp. 265–276.

Wolfe, "Polybenzothiazoles and Polybenzoxazoles" *Ency. Poly. Sci. & Tech.*, vol. 11, pp. 601–635 (1988).

Translation of Japan 63-74,612 (Published Apr. 5, 1988).

*Primary Examiner*—Leo B. Tentoni

[57] ABSTRACT

A simplified and more efficient process is described for drying (and heat-treating) a lyotropic polybenzazole film in which the film is constrained in only the machine direction during drying (and heat-treating). The amount of stretching in the transverse direction the film undergoes prior to it being coagulated can be increased to compensate for the relaxation of the film during the drying process and the lack of stretching during the heat-treating process. Films made in this manner have acceptable finished properties.

9 Claims, No Drawings

PROCESS FOR THE DRYING AND HEAT-TREATMENT OF POLYBENZAZOLE FILMS

BACKGROUND OF THE INVENTION

This invention relates to films containing lyotropic polybenzazole ("PBZ") polymers and processes for drying and heat-treating them.

Processes to dry and heat-treat PBZ film have depended upon the film being constrained in both the machine direction and the transverse direction in order to prevent undesirable side effects such as shrinkage and wrinkling. There is mention of the need for constraining the film during the drying process on page 268 of the article, "Film Processing and Applications for Rigid-Rod Polymers," by Lusignea, *The Materials Science and Engineering of Rigid-Rod Polymers*, Mat. Res. Soc. Symp. Proc., Vol. 134, pp. 265–276, ©1989 by Materials Research Society, as follows "Drying of the water-soaked films results in a reduction in thickness to 1/5 the thickness of the wet film. For this reason, dimensional constraints are needed during drying to control the stress in the film."

Constraint of film in the transverse directions during drying (and heat-treating) is an expensive process because it requires special equipment. It is desirable to have a process for drying and heat-treating polybenzazole films which requires constraint of the film in only the machine direction.

SUMMARY OF THE INVENTION

One aspect of the present invention is a process to dry a wet lyotropic polybenzazole film comprising drying said film while it is constrained in only the machine direction.

The second aspect of the present invention is the process of the first aspect in which the amount of stretching the film undergoes in the transverse direction prior to it being coagulated is increased to compensate for the relaxation of the film in the drying process.

DETAILED DESCRIPTION OF THE INVENTION

As used in this application, these terms have the following definitions:

"Coagulated film" is dope film after it has been contacted with a non-solvent for the polymer. Contacting a dope film with a non-solvent for the polymer causes the polymer to separate from the solvent. Coagulated film has a minimal amount of solvent in it as compared to dope film.

"Constrain" means to restrict the motion of the film so as to prevent a decrease in the size of the film.

"Dope" is a solution of polybenzazole polymer in a solvent.

"Dope film/sheet" is a film/sheet made of uncoagulated dope material that has been formed into a film or sheet by some mechanical operation (i.e., by being cast onto a flat surface or extruded through film/sheet die on an extruder).

"Extruded dope film and/or sheet" is dope material which has been formed into a film/sheet by extrusion through a film/sheet die.

"Film" refers to an article no more than about 10 to 15 mils (0.254 to 0.381 mm) thick, and "sheet" refers to an article greater than about 10 to 15 mils (0.254 to 0.381 mm) thick. This application shall use the term "film" comprehensively to refer to both film and sheet.

"Lyotropic" means a material that changes the phase that it is in depending on its concentration in solution. If a polymer is described as lyotropic liquid-crystalline, it means it Forms liquid-crystalline domains in solutions when its concentration exceeds a "critical concentration point." The critical polymer concentration for a given polymer is dependent on the acid solvent chosen and temperature.

"Machine direction" is abbreviated "MD" and is the direction the film is traveling as it is formed and moved through various unit operations that process it into a finished film.

"Oriented dope film" is a dope film into which orientation has been imparted by some stretching operation (such as through tentering or a blown film process).

"Polybenzazole" includes polybenzoxazole ("PBO") polymers, polybenzothiazole ("PBT") polymers and random, sequential and block copolymers of PBO and PBT. Polybenzazole polymers are lyotropic liquid-crystal polymers that are isotropic in solutions with a low polymer concentration and anisotropic in solutions with more than a certain critical polymer concentration. Typically, there is a broad biphasic region in which there is a mixture of isotropic and anisotropic material. A specific example of a lyotropic liquid crystalline polymer is polybenzoxazole (14 weight percent) dissolved in polyphosphoric acid.

"Strain" or "Stretch" means to cause an increase in the size of the film by the application of external force. The term "strain" is normally used to describe minor increases in size and the term "stretch" is normally used to describe larger increases in size.

"Tentering" is the process of constraining a film by mechanically grasping the edges of the film.

"Transverse direction" is abbreviated "TD" and is the direction in the film plane that is 90° from the machine direction.

Forming a Polybenzazole Dope

As used herein, the term polybenzazole ("PBZ") includes polybenzoxazole ("PBO") homopolymers, polybenzothiazole ("PBT") homopolymers and random, sequential and block copolymers of PBO and/or PBT. Polybenzoxazole, polybenzothiazole and random, sequential and block copolymers of polybenzoxazole and polybenzothiazole are described in references such as Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermooxidatively Stable Articulated p-Benzobisoxazole and p-Benzobisthiazole Polymers*, U.S. Pat. 4,359,567 (Nov. 16, 1982); and Tsai et al., *Method for Making Heterocyclic Block Copolymer*, U.S. Pat. No. 4,578,432 (Mar. 25, 1986), which are incorporated herein by reference.

Units within the polybenzazole polymer are preferably chosen so that the polymer is lyotropic liquid-crystalline. Preferred monomer units are illustrated in Formulae (a)–(h). The polymer more preferably consists essentially of monomer units selected from those illustrated in (a)–(h), and most preferably consists essentially of a number of identical units selected from those illustrated in (a)–(c).

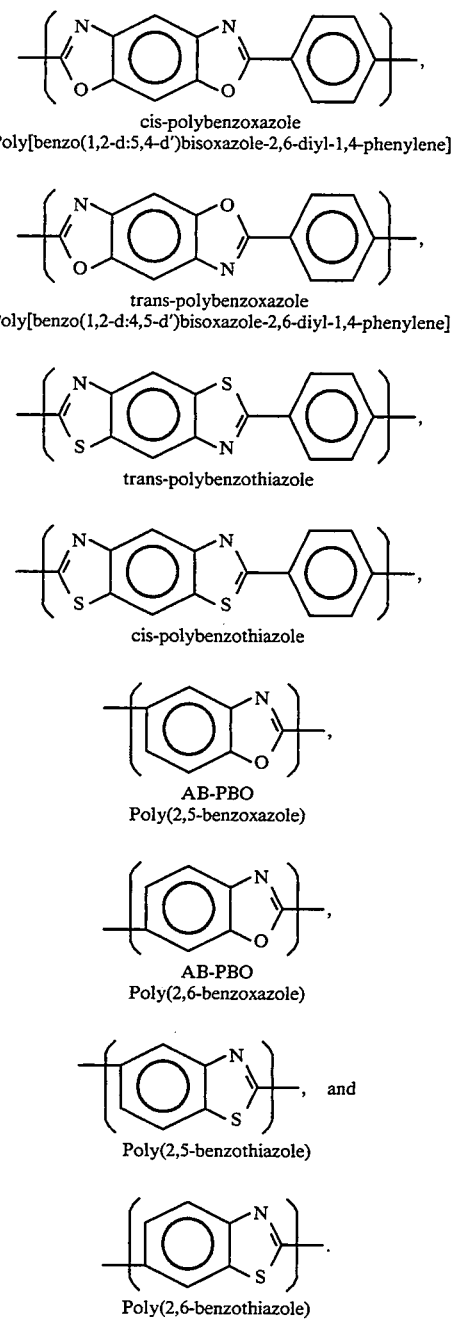

Solvents suitable for formation of dopes of polybenzazole polymers include cresol as well as non-oxidizing acids capable of dissolving the polymer. Examples of suitable acid solvents include polyphosphoric acid, methanesulfonic acid and highly concentrated sulfuric acid and mixtures of those acids. A highly preferred solvent is polyphosphoric acid or methanesulfonic acid. A most highly preferred solvent is polyphosphoric acid. The concentration of the polymer in the solvent is preferably at least about 7 weight percent, more preferably at least about 10 weight percent and most preferably at least about 14 weight percent. The maximum concentration is limited primarily by practical factors, such as polymer solubility and dope viscosity. Because of these limiting factors, the concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); and Harris, U.S. Pat. No. 4,847,350 (Jul. 11, 1989), which are incorporated herein by reference. Polybenzazole polymers can be advanced rapidly to high molecular weight at relatively high temperatures and high shear in a dehydrating solvent acid, according to Gregory et al., U.S. Pat. No. 5,089,591, which is incorporated herein by reference.

Forming a PBZ Dope Film

Typical processes for forming a PBZ dope film require the creation of a PBZ dope. Techniques for forming a PBZ dope include polymerizing the polymer in a solvent or dissolving coagulated polymer in a suitable solvent. More details on the formation of PBZ dopes can be found in the Wolfe et al., (U.S. Pat. No. 4,533,693), Sybert et al., (U.S. Pat. No. 4,772,678) and Harris (U.S. Pat. No. 4,847,350) patents.

A polybenzazole dope film can be formed from a PBZ dope by any known technique such as casting the dope onto a flat surface, extruding the dope through an extruder to form a film or extruding and blowing the dope film to form an extruded blown film. More details describing the extrusion and orientation of a polybenzazole dope film can be found in U.S. Pat. No. 5,367,042 entitled "Process for Fabricating Oriented Polybenazaole Films," which is incorporated herein by reference and in the the following patents: Chenevey, (4,898,924); Harvey et al., (4,939,235); Harvey et al., (4,963,428); and Lusignea et al., (4,966,806), which are incorporated herein by reference. Typically the dope film prepared is preferably no more than about 250 mils (6.35 mm) thick and more preferably it is at most about 100 mils (2.54 mm) thick.

Stretching the Film

Stretching the film in both directions (both in the machine direction and in the transverse direction) is done to improve the finished properties of the film (by causing orientation of the film, see the previously cited article by Lusignea, in *The Materials Science and Engineering of Rigid-Rod Polymers*, for a description of film orientation) and to thin the film to an acceptable level. This stretching process can be done in one direction (referred to as uniaxially stretching the film) or it may be done in both directions (referred to as biaxially stretching the film).

It is necessary to first constrain a film before it can be strained/stretched. The movement of transport rolls acts to constrain the film in the machine direction. Stretching the film in the machine direction, is almost always done. This machine direction stretching can be accomplished by moving the film through roll sets with steadily increasing velocity as described and pictured on pp. 276–277 of *Plastics Extrusion Technology*, ed. by Friedhelm Hensen, ©1988, published by Hanser Publishers.

Constraint of the film in the transverse direction can be accomplished by the mechanical grasping of the edges of the film. This mechanical grasping of the edges of the film is usually referred to as tentering. Straining/- stretching of a film that is being constrained via tentering can be accomplished by increasing the distance between the clamping devices. Stretching of the film in the transverse direction (as well as in the machine direction) can also be accomplished by blowing air (or a suitable gas) inside a cylinder of film wherein the stretching occurs because of the internal stresses put on the film during this blowing process.

As the film is stretched, it thins out and its thickness drops from the thickness that it had as a dope film to a thickness much less than that. The thickness of a stretched polybenzazole dope film can range from about 200 mils (0.51 cm) to about 0.1 mil (0.00254 mm). 0 For liquid-crystalline dopes containing polyphosphoric acid (this polyphosphoric acid being 82 to 85 percent phosphorus pentoxide ($P_2O_5$)) and 14 weight percent rigid rod polybenzoxazole or polybenzothiazole, the temperature for stretching of an unsupported dope 5 (an unsupported dope film is a dope film without any substrate on either side of the film surface) film is preferably at least about 50° C. to 75° C. and the temperature for stretching of a supported dope film is preferably about 100° C. to 120° C. (a supported dope film is a dope film of which one or both sides are substrated with other materials such as TEFLON® (polytetrafluoroethylene) or amorphous polyester film/sheet).

The stretch rate is defined as the distance the film is stretched per unit of time (for example 10 mm/second). A stretch rate should be specified for the machine direction as well as for the transverse direction. Stretching should be carried out at a rate which the dope film can tolerate without tearing. The optimal rate of stretching varies widely depending upon a number of factors such as polymer structure, molecular weight and concentration, solvent acid, dope temperature and desired final properties of the film.

The description of how much stretching the film undergoes at this stage of the process is usually given in terms of a stretch ratio which can be defined for the process as follows:

For a film with initial dimensions of 70 mm in both the machine and the transverse direction, stretching the film 210 mm in the machine direction means the stretch ratio for the machine direction is (70+210)/70=4, and stretching the film 350 mm in the transverse direction means the stretch ratio for the transverse direction is (70+350)/70=6.

Stretching imparts orientation into the film. The amount of orientation can be indirectly measured by measuring the tensile strength and tensile modulus in the film in both the machine and transverse directions. The more a film is stretched the more it is oriented and the more the film is oriented the higher its tensile strength and tensile modulus should be.

The amount of initial stretching (initial stretching is stretching that occurs prior to the film being coagulated) the dope film requires in order to achieve specific levels of strength and modulus in the final finished film, depends on subsequent processing steps. Tensile modulus/strength of the final film is increased by additional orientation but diminished by dimensional relaxation especially relaxation associated with shrinkage. When a film is constrained in the transverse direction ("TD") during drying and heat-treating, it does not undergo dimensional relaxation in the TD. When a film is not constrained in the TD during drying/heat-treating, it does undergo dimensional relaxation which leads to a subsequent reduction in tensile strength and tensile modulus in the TD.

A film dried/heat-treated without constraint in the TD can still have acceptable tensile strength and tensile modulus properties in the TD. If desired, the TD tensile strength and tensile modulus of a film that has been dried/heat-treated while constrained in only the machine direction ("MD") can be increased by increasing the amount of stretching the film undergoes in the TD prior to coagulation. It is, in fact, possible to increase the initial stretching in the TD of a film, that will later be dried/heat-treated while being constrained only in the MD, such that the film will have TD tensile modulus and tensile strength properties similar to films that have been dried/heat-treated under both MD and TD constraint. Increasing the amount of stretching in the transverse direction, preferably at least 25 percent, more preferably at least 50 percent, and most preferably 60 percent or more, should yield a finished film with similar properties to a film that is constrained in both directions during drying/heat-treating.

Coagulation/Washing/Leaching

After stretching, the dope film is coagulated. Coagulation is the process where the solvent is separated from the polymer. The process of coagulation is conducted by subjecting the dope film to contact with a nonsolvent for the PBZ polymer which causes the solvent for the PBZ polymer to separate from the PBZ polymer.

At the conclusion of the coagulation process typically the film still contains 2000 to 5000 ppm phosphorus (the amount, by weight, of residual phosphorus in the film is typically ⅓ the amount of residual phosphoric acid). It is desirable to have less than 2000 ppm phosphorus in PBZ films in order for these films to be useful in certain applications, therefore, once the film has been coagulated it usually is washed and further leached to remove residual amounts of solvent.

A description of the coagulation, washing and leaching process can be found in U.S. Pat. No. 5,302,334 entitled "Process For Coagulating and Washing Lyotropic Polybenzazole Films," and U.S. Pat. No. 5,292,469 entitled "Improved Process For the Coagulation, Washing and Leaching of Shaped Polybenzazole Articles," which are incorporated herein by reference. The leaching process is described in U.S. Pat. No. 5,292,470 entitled, "Convective Leaching of Polybenzazole Films," which is herein incorporated by reference.

Typically when polyphosphoric acid is used as a solvent for PBZ polymer the residual phosphorus level in the finished film is preferably less than 3000 ppm, more preferably less than 1500 ppm and most preferably less than 500 ppm.

Drying/Heat-Treatment

Once the film has been washed/leached, it usually must be dried in order to be useful. It has now been found that constraint of the film during drying can be limited to only the machine direction and that film so dried can still have acceptable dimensions and physical properties. The constraint in the machine direction during drying can be accomplished by adjusting the stress on the film which can be done by adjusting the torque applied to the take-up rolls. Enough stress is put on the film, such that it never droops or sags as it is moved. Drying of PBZ film that is constrained in only the MD can be accomplished by using film drying equipment such as one or more heated rolls or an oven with one or more heated transport rolls.

Basic drying conditions can vary from room temperature drying-to-drying at elevated temperatures, and it also can be done in a batch (non-continuous) or on-line (continuous) manner. Room temperature drying (22° C.) typically is done in a batch mode and takes place over many hours or even days. Drying at elevated temperatures typically takes place in an on-line mode which is preferred because it is the fastest way to dry the film and the speed of drying is important to make the process more economically efficient. It is possible to adequately dry the film on-line by continuously exposing the film to a temperature of 100° C. for about 4 minutes. It is important not to dry the film too fast or at too hot a temperature, because this type of drying will damage the film. The total amount of drying time required is dependent upon the film thickness. Thin films (defined as being 0.2 mils (0.00508 mm) or thinner) require less drying time than do thick films (defined as being greater than 0.2 mils (0.00508 mm) in thickness).

Following drying the film can be heat-treated in order to further enhance its final physical properties, e.g., tensile modulus. Heat-treatment involves exposing the film to elevated temperatures while constraining-even slightly stretching-the film. Typical heat-treating temperatures range from 150° C. to 350° C. and the time for heat-treatment can vary from thirty seconds up to several hours, depending on the desired properties of the finished film. Again, it has been found that it is not necessary to constrain the film in the TD during heat-treatment in order to produce good quality film with acceptable physical properties.

Because the film relaxes or shrinks in the transverse direction when it is constrained in only the machine direction during drying/heat-treating, tensile modulus/strength is not increased and can even diminish. Therefore, the transverse direction properties of such a film will not be as high as those of a film that undergoes drying/heat-treating while being constrained in both directions. However, the overall tensile strength and modulus of films that are constrained in only one direction during drying/heat-treating has been found to be acceptable for most purposes. As was discussed in the section on "Stretching," it is possible to compensate for the reduction in orientation caused by the lack of constraint during drying and lack of constraint/stretching during heat-treatment, by increasing the amount the film is stretched in the transverse direction during the initial stretching of the film.

An advantage of this one dimensional constraint process for drying/heat-treating is that it allows the use of heated rollers and ovens rather than expensive tenter frames which provides for a more economical process. It is also possible to run a slightly less economical process by drying the film while it is constrained in both the MD and the TD and then heat-treating the film while it is constrained in only the MD.

The process of the present invention is more specifically illustrated in the following example. The following examples are for illustrative purposes only, and should not be taken as limiting the scope of either the specification or the claims.

EXAMPLES

Extruded sheets of polybenzoxazole ("PBO") dope (14 weight percent PBO in polyphosphoric acid), 65 mils thick, are sandwiched between TEFLON® (polytetrafluoroethylene) sheets (3 mils) and stored in a vacuum chamber. The PBO dope sheets are stretched in an IWAMOTO® biaxial stretcher. The stretching conditions are as follows: the 70 mm by 70 mm (excluding the part between the gripping mechanism) piece of dope film is loaded into the stretcher and heated with a hand-held heating gun with a temperature of the heating gun set at about 160° C. for up to 3 minutes. The heating of the dope sheet is discontinued just before the stretching.

EXAMPLE 1

For stretching the film, the stretch rate is set at 45 mm/second in the machine direction (MD) and 75 mm/second in the transverse direction (TD). The stretch distance is 210 mm in the MD and 350 mm in the TD which calculates out to be a final stretch ratio of 4 times in the MD and 6 times in the TD. After stretching one part of the film (Biaxially Constrained-or "BC") is mounted onto a round metal frame approximately 9 inches in diameter. This frame ensures that the film is constrained in both the MD and TD during drying-/heat-treating. Another part of the film (Uniaxially Constrained-or "UC") is mounted onto a metal frame approximately 6 inches long and 4.5 inches wide. The mounting took place in such a manner that the MD of the stretch dope is parallel to the longer side of the frame and the stretched dope film is constrained only in the MD during drying and any further processing. Following being put into their respective frames the films are coagulated in a deionized water bath. After coagulation the films are dried at room temperature for 1 hour and further dried at 100° C. A portion of each film is then heat-treated at 300° C. for 1 hour. Heat-treating is accomplished by placing the film in its frame in a 300° C. oven. Strain on the film during this heat-treatment process is provided by the differences in coefficient of thermal expansion ("CTE") between the film and the frame. The frame material typically has a positive CTE whereas the dried, oriented PBO film typically has a negative CTE. (A positive CTE means that the object will expand if it is heated. A negative CTE means that the object will shrink if it is heated.) Therefore a frame, or other constraining fixture which clamps the edges of the film in a manner which minimizes any slippage will then expand and strain the film when it is heated.

The final thickness of the dried/heat-treated film is about 0.25 mils and the film samples have the following physical properties. (Note: BC means the film is biaxially constrained (in both the machine direction and the transverse direction) during drying/heat-treating and UC means the film is uniaxially constrained (only in the machine direction) during drying/heat-treating. Tensile modulus is reported for both the machine direction (MD) and the transverse direction (TD) in GPa, which is giga pascals, tensile strength is reported for both the machine direction (MD) and the transverse direction (TD) in GPa, NHT stands for "Not Heat-Treated" and HT stands for "Heat-Treated". CTE stands for Coefficient of Thermal Expansion which is reported in units of ppm/°C. or pm/m °C. An asterisk (*) means a property is not tested for this sample.)

| Film | Tensile modulus (GPa) | Tensile strength (GPa %) | CTE (ppm/°C.) |
| --- | --- | --- | --- |
| BC (NHT) | 31.7 (MD) | .451 (MD) | * |

| Film | Tensile modulus (GPa) | Tensile strength (GPa %) | CTE (ppm/°C.) |
|---|---|---|---|
| | 49.6 (TD) | .775 (TD) | * |
| BC (HT) | 46.9 (MD) | .604 (MD) | −5.3 (MD) |
| | 63.4 (TD) | .920 (TD) | −5.15 (TD) |
| UC (NHT) | 33.1 (MD) | .503 (MD) | −3.9 (MD) |
| | 29.0 (TD) | .414 (TD) | −2.3 (TD) |
| UC (HT) | 34.5 (MD) | .393 (MD) | −1.9 (MD) |
| | 39.3 (TD) | .655 (TD) | −4.9 (TD) |

Because all of these films underwent the same stretching protocol, the physical properties in the transverse direction for the UC film are lower than those for the BC film, which accurately reflects the relaxation of the film during the drying/heat-treating stage.

EXAMPLE 2

The film stretch rate is set at 60 mm/second in the machine direction (MD) and 75 mm/second in the transverse direction (TD). The stretch distance is 280 mm in the MD and 350 mm in the TD which calculates out to be a final stretch ratio of 5 times in the MD and 6 times in the TD. After stretching, part of the film (Biaxially Constrained or "BC") is mounted onto a round metal frame approximately 9 inches (22.9 cm) in diameter. This frame ensures that the film is constrained in both the MD and TD during drying/heat-treating. Another part of the film (Uniaxially Constrained or "UC") is mounted onto a metal frame approximately 6 inches (15.2 cm) long and 4.5 inches (11.4 cm) wide with a convex shorter side. The mounting takes place in such a manner that the MD of the dope is parallel to the longer side of the frame and the 5 stretched dope film is constrained only in the MD during drying and any further processing. After being put into their respective frames the films are coagulated in a deionized water bath. After coagulation the films are dried at room temperature for 1 hour and further dried at 100° C. The final thickness of the dried film is about 0.23 mils and the film samples have the following physical properties. All abbreviations have the same meaning as in the last example.

| Film | Tensile Modulus GPa | Tensile Strength GPa |
|---|---|---|
| BC (NHT) | 37.2 (MD) | .427 (MD) |
| | 32.8 (TD) | .397 (TD) |
| UC (NHT) | 37.6 (MD) | .405 (MD) |
| | 28.2 (TD) | .490 (TD) |

What is claimed is:

1. A process for the preparation of a polybenzazole film which comprises (1) extruding a polybenzazole dope film in a machine direction, (2) stretching the film in a direction which is approximately transverse to the machine direction, (3) coagulating the film, and (4) drying the film while it is constrained in only the machine direction.

2. The process of claim 1 in which the amount of stretching the film undergoes in the transverse direction prior to it being coagulated is increased to compensate for the relaxation the film undergoes in the drying process.

3. The process of claim 1 in which the amount of stretching the film undergoes in the transverse direction prior to it being coagulated is increased by at least about 25 percent.

4. The process of claim 1 in which the amount of stretching the film undergoes in the transverse direction prior to it being coagulated is increased by at least about 50 percent.

5. The process of claim 1 in which the amount of stretching the film undergoes in the transverse direction prior to it being coagulated is increased by at least about 60 percent.

6. The process of claim 1 further comprising heat treating said polybenzazole film while it is constrained in only the machine direction.

7. The process of claim 6 in which the amount of stretching the film undergoes in the transverse direction prior to it being coagulated is increased to compensate for the relaxation of the film in the drying process and the lack of stretching of the film in the heat-treating process.

8. The process of claim 1 in which said lyotropic polybenzazole film is a polybenzoxazole film.

9. A process for the preparation of a polybenzazole film which comprises (1) extruding a polybenzazole dope film in a machine direction, (2) stretching the film in a direction which is approximately transverse to the machine direction, (3) coagulating the film, and (4) drying the film, and (5) heat-treating the film while it is constrained in only the machine direction, wherein the amount of stretching the film undergoes in the transverse direction prior to it being coagulated is increased to compensate for the lack of stretching in the heat-treating process.

* * * * *